(12) United States Patent
Clarke et al.

(10) Patent No.: US 12,551,979 B2
(45) Date of Patent: Feb. 17, 2026

(54) SURFACING STATION FOR MANUFACTURING OPTICAL ELEMENTS AND RELATED MANUFACTURING FACILITY

(71) Applicant: SATISLOH AG, Baar (CH)

(72) Inventors: Lawrence Michael Clarke, Zug (CH); Michael Kreis, Gruendau (DE); Johannes Claar, Ebsdorfergrund (DE)

(73) Assignee: SATISLOH AG, Baar (CH)

( * ) Notice: Subject to any disclaimer, the term of this patent is extended or adjusted under 35 U.S.C. 154(b) by 0 days.

(21) Appl. No.: 18/667,619

(22) Filed: May 17, 2024

(65) Prior Publication Data

US 2024/0300065 A1 Sep. 12, 2024

Related U.S. Application Data

(62) Division of application No. 16/181,905, filed on Nov. 6, 2018, now Pat. No. 12,023,775.

(30) Foreign Application Priority Data

Nov. 7, 2017 (EP) ..................................... 17200398

(51) Int. Cl.
*B24B 13/06* (2006.01)
*B24B 9/14* (2006.01)
(Continued)

(52) U.S. Cl.
CPC ................ *B24B 13/06* (2013.01); *B24B 9/14* (2013.01); *B24B 13/0037* (2013.01);
(Continued)

(58) Field of Classification Search
CPC ....... B24B 13/06; B24B 13/0037; B24B 9/14; B24B 27/0023; B24B 27/0069; B24B 27/0076; B24B 49/12
See application file for complete search history.

(56) References Cited

U.S. PATENT DOCUMENTS

| 5,014,468 A | 5/1991 | Ravipati et al. |
| 6,567,718 B1 | 5/2003 | Campbell et al. |

(Continued)

FOREIGN PATENT DOCUMENTS

| DE | 10 2014 015 053 A1 | 4/2016 |
| EP | 2 631 033 B1 | 9/2015 |

(Continued)

OTHER PUBLICATIONS

Extended European Search Report with Written Opinion issued May 28, 2018 in European application 17200398.0, filed on Nov. 7, 2017.

(Continued)

*Primary Examiner* — Joel D Crandall
(74) *Attorney, Agent, or Firm* — Oblon, McClelland, Maier & Neustadt, L.L.P.

(57) ABSTRACT

There is provided a surfacing station for processing of surfaces of optical elements as workpieces, including a processing unit configured to process surfaces of optical elements; a controller unit configured to communicate with a database containing processing protocols, which can be carried out by the surfacing station, and to control operation of the processing unit in accordance with the processing protocols; and an identification tag base configured to communicate with the controller unit and configured to determine identification tags of consumable items used by the surfacing station, the controller unit being configured to enable a surfacing protocol for processing of the optical elements as workpieces in function of an identified consumable item.

11 Claims, 5 Drawing Sheets

(51) Int. Cl.
  *B24B 13/00* (2006.01)
  *B24B 27/00* (2006.01)
  *B24B 49/12* (2006.01)
  *B24B 51/00* (2006.01)

(52) U.S. Cl.
  CPC ...... *B24B 27/0023* (2013.01); *B24B 27/0069* (2013.01); *B24B 27/0076* (2013.01); *B24B 49/12* (2013.01); *B24B 51/00* (2013.01)

(56) References Cited

U.S. PATENT DOCUMENTS

| | | | |
|---|---|---|---|
| 2007/0063029 A1 | 3/2007 | Brandt et al. | |
| 2008/0132147 A1 | 6/2008 | Takeichi | |
| 2009/0305609 A1 | 12/2009 | Khau et al. | |
| 2013/0072088 A1* | 3/2013 | Schneider | B23B 5/00 451/442 |
| 2013/0075465 A1 | 3/2013 | Schneider | |
| 2013/0273815 A1 | 10/2013 | Schneider | |
| 2015/0053530 A1 | 2/2015 | Schneider | |
| 2017/0246720 A1* | 8/2017 | Wallendorf | B24B 9/14 |
| 2017/0246729 A1 | 8/2017 | Philipps et al. | |

FOREIGN PATENT DOCUMENTS

| | | | |
|---|---|---|---|
| EP | 2 998 067 A2 | 3/2016 | |
| JP | 2007-229844 A | 9/2007 | |
| JP | 2008310404 A | 12/2008 | |
| WO | WO 2015/087742 A1 | 6/2015 | |
| WO | WO-2018160658 A2 * | 9/2018 | ............ B24B 23/02 |

OTHER PUBLICATIONS

European Office Action issued Jun. 21, 2022 in European Patent Application No. 18204449.5, 5 pages.
Combined Chinese Office Action and Search Report issued Aug. 16, 2022, in corresponding Chinese Patent Application No. 201811317216.5 (with English Translation), 21 pages.
Yang Hui, "New Process in Precision and Ultra-precision Processing Technology", Aviation Industry Press, Aug. 2016, pp. 130-132.
Su Chun et al., "Digital Design and Manufacturing", China Machine Press, Dec. 2009, pp. 279-280.
Extended European Search Report issued Nov. 14, 2024 in European Patent Application No. 24185608.7, 9 pages.
European Communication of a Notice of Opposition issued Apr. 24, 2025, corresponding European Patent No. 18204449.5, 54 pages (with English Translation).
Optik Maisch, "Brillenglasproduktion R+H", Youtube, Retrieved from the Internet [URL: httsp:www.youtube.com/watch?v=D5xyeL2QQq8], Jan. 16, 2015, 1 page (with English Translation of the German video "Brillenglasproduktion R+H").
Combined Chinese Office Action and Search Report issued Jul. 22, 2025 in Chinese Patent Application No. 202310511845.6 (with English Translation), 14 pages.

* cited by examiner

SURFACING STATION FOR MANUFACTURING OPTICAL ELEMENTS AND RELATED MANUFACTURING FACILITY

This application is a divisional Applications of U.S. application Ser. No. 16/181,905, filed Nov. 6, 2018, which claims priority to European Application No. 17200398.0, filed Nov. 7, 2017. The entire contents of the above-identified applications are incorporated herein by reference.

FIELD OF THE INVENTION

The invention relates to a surfacing station, in particular a polishing station for manufacturing optical elements like spectacle lenses according to a prescription and more generally to a related manufacturing facility with different processing stations, in particular for fine processing of optically effective surfaces.

BACKGROUND AND PRIOR ART

If in the following, by way of example, reference is made to "optical elements", in particular "spectacle lenses" for workpieces with optically effective surfaces there is to be understood by that not only optical elements of mineral glass, but also optical elements of all other customary materials such as polycarbonate, CR 39, HI index, etc., thus also plastics material.

Processing of optically effective surfaces of spectacle lenses by material removal can be roughly divided into two processing phases, namely initially preparatory processing of the optically effective surface for producing the macro-geometry in accordance with prescription and then fine processing of the optically effective surface in order to eliminate preparatory processing tracks and obtain the desired micro-geometry. Whereas preparatory processing of the optically effective surfaces of spectacle lens is carried out in dependence on, inter alia, the material of the spectacle lenses by grinding, milling and/or turning. In fine processing the optically effective surfaces of spectacle lenses are usually subjected to a precision-grinding, lapping and/or polishing process, for which purpose use is made of an appropriate machine.

To that extent, in the terminology of the present application the term "polishing", including expressions such as, for example, "polishing tool" or the like is to embrace precision-grinding and lapping processes, in the example thus precision-grinding or lapping tools.

Manually loaded polishing machines in RX workshops, in particular, are usually constructed as "twin machines" so that advantageously two spectacle lenses of an "RX job"—a spectacle lens prescription generally consists of a pair of spectacle lenses—can be subjected to fine processing simultaneously. Such "twin" polishing machines are known from, for example, documents DE-10 2009 041 442 A1 and DE 10 2011 014 230 A1, which with respect to machine kinematics form the closest prior art.

According to, for example, the last-mentioned document (see, in particular, FIGS. 1 to 5 thereof) such a polishing machine comprises a machine housing bounding a work space into which project two workpiece spindles, by way of which the two spectacle lenses to be polished can be driven by means of a rotary drive to rotate about substantially mutually parallel workpiece axes of rotation C1, C2. On the tool side, the polishing machine has a first linear drive unit by means of which a first tool carriage is movable along a linear axis X extending substantially perpendicularly to the workpiece axes of rotation C1, C2, a pivot drive unit which is arranged on the first tool carriage and by means of which a pivot yoke can be pivoted about a pivot setting axis B extending substantially perpendicularly to the workpiece axes of rotation C1, C2 and substantially perpendicularly to the linear axis X, a second linear drive unit which is arranged on the pivot yoke and by means of which a second tool carriage is movable along a linear setting axis Z extending substantially perpendicularly to the pivot setting axis B, and two tool spindles each with a respective tool mounting section, wherein each of the tool mounting sections projects into the work space to be associated with a respective one of the workpiece spindles.

Each tool spindle has a spindle shaft on which the respective tool mounting section is formed and which is mounted in a spindle housing to be driven to rotate about a tool axis of rotation A1, A2, which housing in turn is guided in a guide tube to be capable of defined axial displacement in the direction of the tool axis of rotation. Whereas the spindle housings of the two tool spindles are flange-mounted on the second tool carriage, the guide tubes are mounted on the pivot yoke so that as a result the tool axis of rotation A1 or A2 of each tool spindle forms with the workpiece axis of rotation C1 or C2 of the associated workpiece spindle a plane in which the respective tool axis of rotation A1 or A2 is axially displaceable (linear axis X, linear setting axis Z) and tiltable (pivot setting axis B) with respect to the workpiece axis of rotation C1 or C2 of the associated workpiece spindle.

By virtue of the given possibilities of movement, the prior art polishing machine allows—with a compact construction—pairwise processing of spectacle lenses by a so-called "tangential polishing kinematic" in which the polishing tools axially adjusted (Z) together with the tool spindles are moved under a preset, and fixed, pivot angle (B) of the tool spindles in oscillation with relatively small strokes transversely (X) over the spectacle lenses, but also with a polishing kinematic in which the adjusted (Z) polishing tools during the oscillating transverse movement (X) thereof at the same time continuously pivot (B) so as to follow the surface curvature of the spectacle lenses, wherein the spectacle lenses and the polishing tools can be driven (but do not have to be at least as far as the polishing tools are concerned) in the same sense or opposite sense at the same or different rotational speeds about the axes of rotation (A1, A2, C1, C2) thereof.

However, in the case of specific materials which are difficult to polish such as, for example, polycarbonate materials or high-index material it is still desirable to process with different polishing bases in order to reduce polishing times and/or achieve specific surface qualities, which in the afore-described prior art would require a change of polishing tools. The same applies if spectacle lenses to be polished in succession significantly differ in the geometry thereof (surface curvature, diameter). Tool change times thus required can indeed be significantly reduced for industrial production by use of automated tool changers with tool magazines, but this would be involve a substantial outlay on equipment and investment costs.

In order to resolve this problem, the Applicant of the present application has proposed in DE 10 2014 015 053 (hereby incorporated by reference) a polishing station allowing different processing strategies without requiring longer processing times.

According to DE 10 2014 015 053, the polishing station comprises a workpiece spindle, which projects into a work space and by way of which a workpiece to be polished is drivable for rotation about a workpiece rotational axis C, and two tool spindles which are associated with the workpiece spindle and project oppositely into the work space and on each of which a respective polishing tool is mounted to be drivable for rotation about a tool rotational axis A, A' and to be axially adjustable along the tool rotational axis A, A', the tool spindles being movable relative to the workpiece spindle in common along a linear axis extending substantially perpendicularly to the workpiece rotational axis and being pivotable about different pivot setting axes extending substantially perpendicularly to the workpiece rotational axis and substantially perpendicularly to the linear axis.

This polishing station is in particular interesting when different polishing tools are used at the two tool spindles of one device it is possible to carry out, for example, preparatory polishing and fine polishing with different polishing slurry carriers also known as polishing pads in one tool chucking, which makes very short polishing times possible with, at the same time, increased surface quality.

It is also possible, to increase the working range of the device by use of polishing tools of different size (tool diameter) and/or different curvature (tool radius of curvature) at the two tool spindles of one device. Thus, for example, very small or very large workpieces with, in a given case, strongly curved surfaces can be processed by the device without a tool change having to be undertaken for that purpose, which consequently is helpful towards achieving shorter overall processing times.

However, the applicant has observed that the usage rate of such polishing stations, in particular in an automated manufacturing facility is not optimized, in particular when one of the two polishing tools associated to one workpiece spindle is worn and needs to be replaced whereas the other tool still may be used further on. This situation may occur frequently if the different polishing tools have different lifetimes, in case the tool usage is different in function of the lenses to be polished (indeed, not all lens blanks need a preparatory polishing) or a defect appears on one of the polishing tools. In this case, to avoid scrapping of lens blanks, the whole polishing station is stopped while waiting for a maintenance operation replacing the worn or defect polishing tool.

This problem can be extended also to other surfacing stations than polishing stations like for example finishing stations for example for edging optical elements like spectacle lenses.

Therefore one object of the present invention is to improve the usage rate of surfacing stations like for example a polishing station in particular when integrated in an automated manufacturing facility.

To this extent, the present invention proposes a surfacing station for processing of surfaces of optical elements as workpieces comprising:
- a processing unit for processing surfaces of optical elements,
- a controller unit configured to communicate with a database containing processing protocols which can be carried out by the surfacing station, and controlling the operation of the processing unit in accordance to the processing protocols,
- wherein the surfacing station further comprises an identification tag base configured to communicate with the controller unit and configured to determine identification tags of consumable items used by the surfacing station, the controller unit being configured to enable a surfacing protocol for processing of optical elements as workpieces in function of the identified consumable item.

Thanks to the identification tag reader, a consumable item can be installed or supplied safely in the surfacing station and malfunctioning or a possibility of confusion can be avoided. In particular, the surfacing station may configure itself by enabling only processing protocols that are compatible with the consumable items installed. Furthermore, re-use of consumable items where the life-time has for example not yet expired is possible.

The surfacing station according to the invention may comprise one or several of the following features taken alone or in combination:

According to one aspect, the identification tag contains data about the type of the consumable item.

According to another aspect, the tag contains data about lifetime and/or quantity of the consumable item.

The identification tag may be a RFID tag or a barcode/matrix code tag.

The surfacing station may be a polishing station, the processing protocol is for example a polishing protocol and the consumable item comprises at least one consumable item out of the following group of consumable items: a polishing disc of a polishing tool or a container of polishing slurry.

When the surfacing station is a polishing station as defined above,
the polishing station may comprise
i) a workpiece spindle, which projects into a work space and by way of which a workpiece to be polished is drivable for rotation about a workpiece axis of rotation,
ii) two tool spindles which are associated with said workpiece spindle and project oppositely into the work space and configured to support a respective polishing tool drivable for rotation about a tool axis of rotation and axially adjustable along the tool axis of rotation, the database containing at least one polishing protocol including a two-step polishing process with different polishing medium carriers and at least one polishing protocol including a one-step polishing process.

According to a further aspect, the surfacing station may comprise a tag writer configured to write life-time data to the identification tag allowing re-use of the consumable item if life-time of the consumable item has not expired.

The controller unit is for example further configured to generate an output of enabled processing protocols for processing of optical elements as workpieces.

According to one aspect, the data base contains for at least for one specific job data a first two-step processing protocol and a second one-step processing protocol of longer duration than the first two-step processing protocol and leading to the same processing result and the controller unit is configured to switch from said first two-step processing to said second one step processing in case the first two-step processing protocol is disabled.

The present invention also relates to a manufacturing facility for manufacturing of optical elements comprising:
several surfacing stations as defined above,
a transfer system for conveyance of optical elements to be processed according to specific job data, a management system communicating with the controller units of the surfacing stations and controlling the transfer system for conveyance of the optical elements to be processed, wherein the management system is configured to control the transfer system to convey optical elements to be processed according to specific job data to a surfacing station where the enabled processing protocol(s) corresponds to the job data of the optical elements to be processed.

According to one aspect, in case the surfacing station is a polishing station, the management system may be configured to analyze a predetermined number of job data of optical elements to be processed, to determine an optimized polishing tool configuration of the pool of polishing stations, and to generate an output for exchange of polishing tools within the pool of polishing stations if the optimized polishing tool configuration differs from the working polishing tool configuration.

The present invention also relates to a polishing disc for a polishing tool for processing of surfaces of optical elements as workpieces for a polishing station comprising:

a base body which has a center axis and to which is secured an intermediate layer, on which a polishing medium carrier rests, of a resilient material, an RFID tag configured to be read by the identification tag base of the polishing station and including the type of the polishing disc and life-time data, wherein the RFID tag is integrated in the base body of the polishing disc on the center axis.

The invention also relates to a method for operating a surfacing station for processing of surfaces of optical elements as workpieces as defined above, comprising the following steps:

determining the information contained on the identification tag of the consumable item, enabling processing protocol(s) for processing of optical elements as workpieces in function of the identified consumable item.

According to one aspect, the identification tag is a RFID tag and the method further comprises the step of writing life-time data to the RFID tag allowing re-use of the consumable item if life-time of the consumable item has not expired.

The invention also relates to a method for operating a manufacturing facility for manufacturing of optical elements as defined above comprising a step of conveying optical elements to be processed according to specific job data to a surfacing station where the enabled processing protocol(s) corresponds to the job data of the optical elements to be processed.

In case the data base contains for at least one specific job data a first two-step processing protocol and a second one-step processing protocol of longer duration than the first two-step processing protocol and leading to the same processing result, the method may comprise furthermore the step of switching from said first two-step processing to said second one step processing in case the first two-step processing protocol is disabled.

In case the surfacing stations are polishing stations, the method may further comprise the steps of analyzing a predetermined number of job data of optical elements to be processed, determining an optimized polishing tool configuration of the pool of polishing stations, and generating an output for exchange of polishing tools within the pool of polishing stations if the optimized polishing tool configuration differs from the working polishing tool configuration.

BRIEF DESCRIPTIONS OF THE DRAWINGS

Other advantages and characteristics will appear with the reading of the description of the following figures.

DETAILED DESCRIPTION

The embodiment(s) in the following description are only to be considered as examples. Although the description may refer to one or several embodiments, this does not mean inevitably that every reference concerns the same embodiment, or that the characteristics apply only to a single embodiment. Simple characteristics of various embodiments can be also combined to new embodiments that are not explicitly described.

In the present description, the terms "upstream" and "downstream" are used according the following meaning: a first station for a certain processing operation of an optical element is placed upstream with respect to a second station when the optical element undergoes first the operation in the first station and then another operation in the second station.

And a first station for processing a certain processing operation of an optical element is placed downstream with respect to a second station when the optical element undergoes first the operation in the second station and then another operation in the first station.

By "surfacing", it is understood in particular polishing, grinding, fine grinding or finishing and the overall object is to yield a finished spectacle lens so that the curvature of the first (in this instance convex) face cx and the curvature of the machined second (in this instance concave) face cc cooperate to yield desired optical properties according to a prescription of the user of the spectacle lenses.

An optical element refers for example to an ophthalmic optical product, a lens blank or a semi-finished lens blank. The optical element may present or not an optical correction and may be used for as spectacle lens, in particular as sunglasses or masks.

The optical element may be formed of one layer or several layers attached to each other and forming a unitary element.

Figure 1:
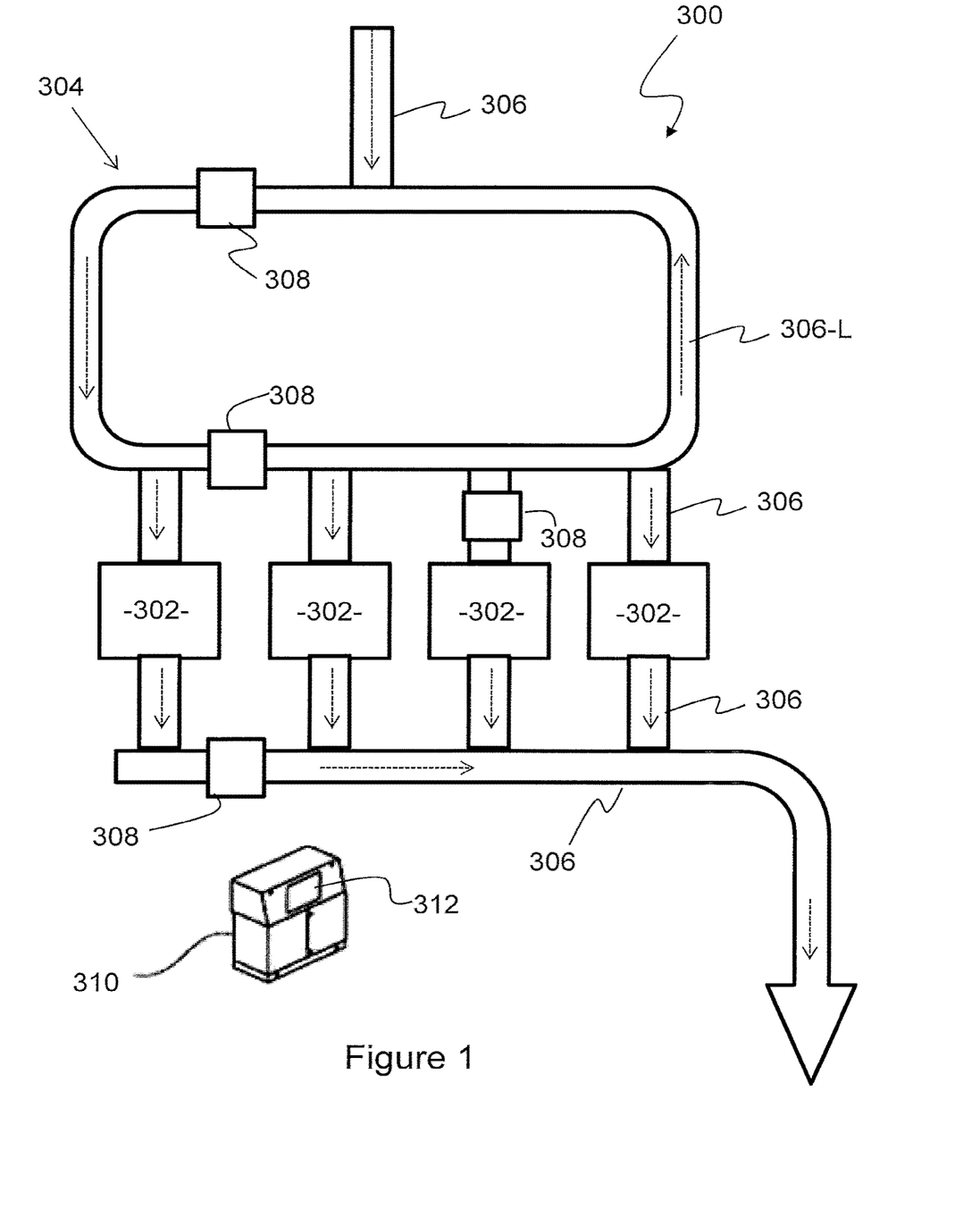
FIG. 1 shows a simplified diagram of an example of a manufacturing facility for manufacturing of optical elements like spectacle lenses according to the present invention.
Figure 4:
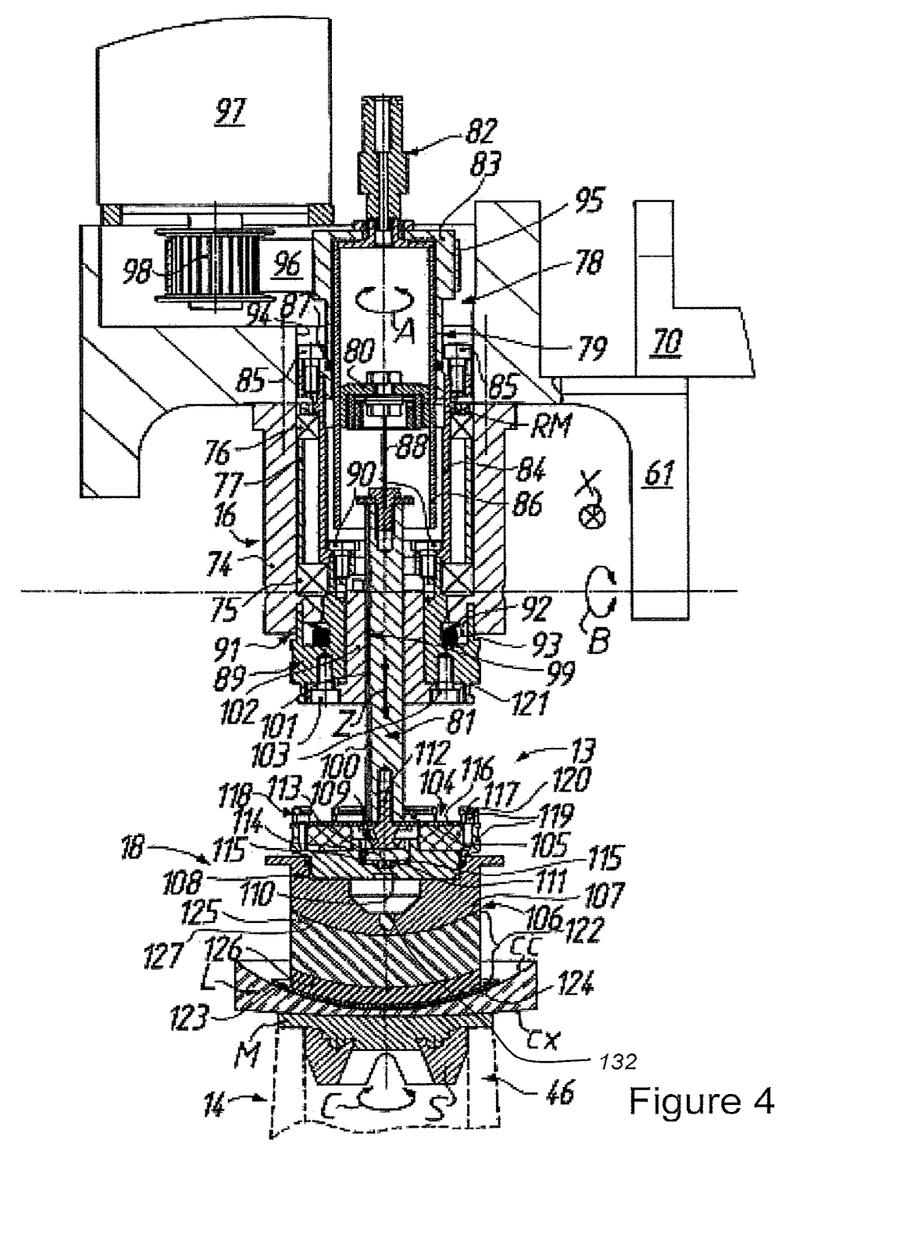
FIG. 4 shows an example of a longitudinal section view of the front tool spindle, which is mounted in the front pivot yoke of the polishing station, with a polishing tool, at the tool mounting head of which is detachably mounted a polishing disc disposed in processing engagement with a surface to be processed, wherein the polishing tool is disposed in a lower setting moved out (adjusting axis Z) relative to the tool spindle and the associated bellows have been omitted for simplification of the illustration, FIG. 4 being nearly identical to FIG. 8 of DE10 2014 015 053 (US2017/0246720)

In FIG. 1 is shown a manufacturing facility 300 for manufacturing of optical elements as for example spectacle lenses L (see FIG. 4).

The manufacturing facility 300 comprises several surfacing stations, in the present example realized as polishing stations 302, four in the present case.

In the present description, a polishing station 302 is described in detail as a possible example of a surfacing station for processing of surfaces of spectacle lenses. Therefore when referring to reference 302, it is referred to a surfacing station in general which encompasses a polishing station 302 in particular, but also for example a finishing station configured to edge for example already coated spectacle lenses.

The manufacturing facility 300 may also comprise other not shown processing stations like blocking stations disposed upstream the polishing stations 302 or washing stations, tunnel ovens, coating stations, deblocking stations, or finishing stations disposed downstream the polishing stations 302.

The manufacturing facility 300 further comprises a transfer system 304 for conveyance of optical elements to be processed according to specific job data.

In FIG. 1 are shown different conveyors 306 among which also a loop conveyor 306-L. The conveyors 306, 306-L link different processing stations and are in particular in FIG. 1 linked to the polishing stations 302 to supply optical elements like lens blanks to be polished or surfaced and to convey polished optical elements to further processing stations for example for coating.

The optical elements as for example lens blanks are transported in transportation trays 308 which circulate in the transfer system 304.

The manufacturing facility 300 also comprises a management system 310 with a display and control panel 312. The management system 310 may comprise computers, processors and memories as well as software for controlling the whole manufacturing process of the optical elements L.

The management system 310 communicates with the different processing stations, in particular with polishing stations 302 and controls the transfer system 304 with its conveyors 306, 306-L.

The management system 310 also receives job data for each spectacle lens L to be manufactured. Each transportation tray 308 contains in general two lens blanks to be processed and is specifically identified for example by a tray identification tag. Such tray identification tag may be a RFID tag or a barcode/matrix code. Different tag readers are disposed in the transportation system 304, in particular along conveyors 306, 306-L and allow localizing and directing the transportation trays 308 within the manufacturing facility 300. Thus, the management system 310 is configured to route the transportation trays 308 between the different processing stations.

Furthermore, each tray identification tag is associated with job data for processing the lens blanks contained in the associated transportation tray 308 in order to obtain final lenses that are in conformity with a prescription and wishes of a user, in particular the prescribed optical correction power and specific treatments applied to the lenses according to the wishes of the user in order to enhance for example the vision comfort of the user and to protect the optical elements against aggressions like for example scratches, dust and soiling materials.

An example of a surfacing station as polishing station 302 according the present invention will now be described with reference to FIGS. 2-5. Concerning many aspects, in particular mechanical construction, the polishing station 302 may be similar to that disclosed in DE10 2014 015 053 (US2017/0246720) incorporated by reference.

However, the present invention is not limited to such a polishing station 302 and may be applied to simpler polishing stations or other surfacing stations like finishing stations.

Figure 2:
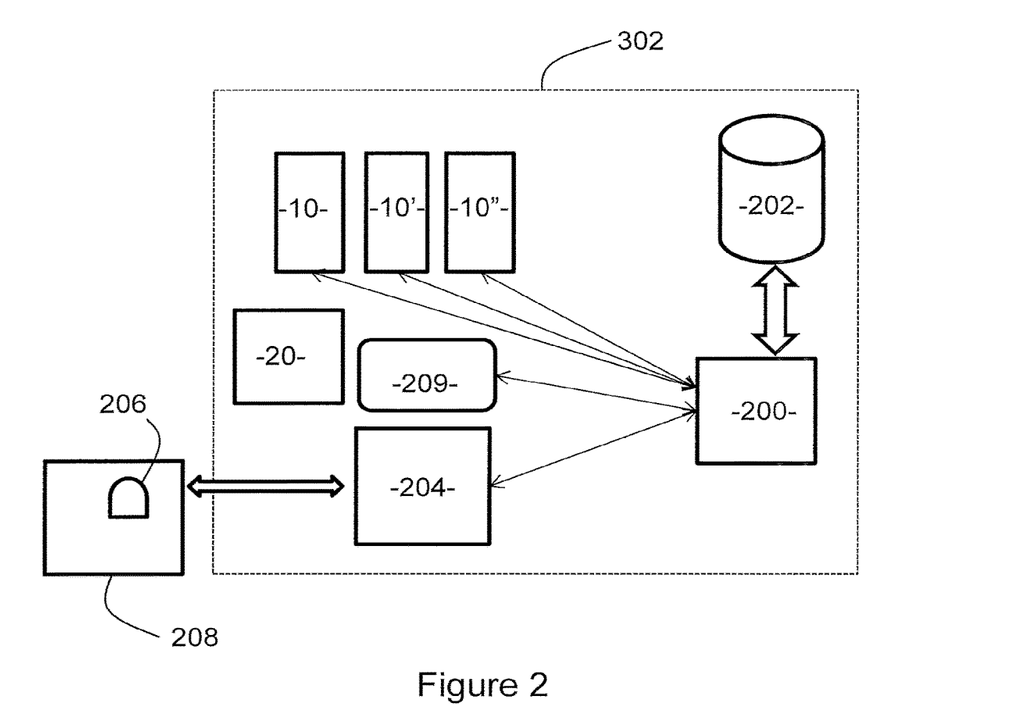
FIG. 2 shows a simplified diagram of an example of a polishing station as an example of a surfacing station according to the present invention.

As shown schematically in FIG. 2, the polishing station 302 comprises three processing units realized in the present example as polishing cells 10, 10', 10" of respectively identical construction.

In the present description, a polishing cell will be described in detail as a possible example of a processing unit for processing of surfaces of optical elements. Therefore when referring to references 10, 10', 10", it is referred to a processing unit in general which encompasses a polishing cell 10, 10' or 10" in particular, but also for example a processing unit in a finishing station configured to edge for example already coated optical elements.

Polishing station 302 furthermore comprises a controller unit 200.

This controller unit 200 comprises for example a processor and memories (for example a PC) and is charged with adequate software to run the polishing station in particular each of the polishing cells 10, 10', 10".

The controller unit 200 is further configured to communicate with a database 202 of processing protocols (=polishing protocols in the case of a polishing station).

In the present description, it is referred to a polishing protocol in particular as a possible specific example of a processing protocol. Therefore when referring to a polishing protocol, it is referred to a processing protocol in general which encompasses a polishing protocol in particular, but also for example a processing protocol of a finishing station configured to edge for example already coated optical elements.

A processing protocol (=polishing protocols in the case of a polishing station) may be carried out by the surfacing station 302. This database 202 may be a part of the memories of the controller unit 200 as represented in FIG. 2 but may also be located outside the surfacing station 302, for example on a server or within the management system 310.

A surfacing protocol is a series of instructions, in particular in case of a polishing protocol for example kinematic movements, for polishing a lens blank in order to achieve at least some of the desired optical properties of the lens L.

In particular, a polishing protocol may contain instructions to realize a first a preparatory polishing step on a lens L and then, secondly, a fine polishing step. This case is referred to as two-step protocol.

A one-step protocol refers to the case when only a fine polishing step is applied.

The polishing protocols in database 202 can be in particular one-step or two-step polishing protocols. Usually the database 202 will contain a larger amount of polishing protocols which can be a combination of specific one- and two-step polishing protocols.

Such polishing protocols are adapted and optimized with respect to job data information for manufacturing of optical elements in particular lens material and desired subsequent coating in order to reduce manufacturing time while ensuring highest quality standards.

For example database 202 may comprise at least one polishing protocol including a two-step polishing process with different polishing pads or polishing medium carriers and at least one polishing protocol including a one-step polishing process.

The controller unit 200 is further configured to control the operation of the polishing cells 10, 10', 10" in accordance to the polishing protocols and also taking into account the job data of the lenses to be manufactured (optical power, curvatures, lens material, etc.).

The controller unit 200 is for example further configured to enable or disable specific features of the polishing station 302 in function of the determined identification tag 206, concerning for example monitoring features.

The polishing station 302 further comprises an identification tag base 204 (for example an identification tag reader) configured to communicate with controller unit 200 of the polishing station 302 and configured to determine information, for example by reading, on identification tags 206 (RFID tag or a barcode/matrix code tag) of consumable items 208 (like a polishing discs 106, 106' in FIG. 3) used by the polishing station 302.

When supplying a consumable item 208 to polishing station 302 like for example a polishing disc 106 or a container of polishing slurry (not shown), an operator passes the consumable item 208 in front of the identification tag base 204 which may be installed near a control and display panel 209. The information on the identification tag 206 is determined and sent to the controller unit 200 which can adapt the functioning of the polishing station 302 in accordance to the installed consumable items 208, in particular by enabling or not a polishing protocol for processing of optical elements as workpieces and/or enabling or disabling specific features of the polishing station 302.

The identification tag 206 contains data about the type of the consumable item for example a polishing disc 106 and for which type of polishing the polishing disc 106 is suited (for example universal polishing, preparatory polishing, fine polishing etc.). The type of the consumable item 208 may be related to specific polishing protocols in database 202. The identification tag may also comprise information about the manufacturer, the production date etc. This information may also be related to specific features or functions of the polishing station 302 that may be enabled or not dependent on the information contained in the identification tag 206.

The identification tag 206 may further contain directly or indirectly information about the life-time and/or quantity of the consumable item 208.

For example, when, after respective identification tags 206 being determined, in one polishing cell 10 are installed a first polishing disc 106 for preparatory polishing or grinding and a second polishing disc 106' for fine polishing, the controller unit 200 enables for this polishing cell 10 one polishing protocol for one-step polishing (only fine polishing) and one polishing protocol for two-step polishing (preparatory polishing or grinding followed by fine polishing).

Assuming after some time, the first polishing disc 106 for preparatory polishing or grinding 106 is worn out because its life-time is over, then the controller unit 200 disables the polishing protocol for two-step polishing (preparatory polishing followed by fine polishing). However, the polishing cell 10 can still continue to function but only for jobs requesting the polishing protocol for one-step polishing (only fine polishing).

In this context, enabling or not a processing protocol is not mere blocking of the processing of the station or not.

For example if after respective identification tags 206 being determined, in one polishing cell 10 are installed a first polishing disc 106 for preparatory polishing or grinding and a second polishing disc 106' for fine polishing, the controller unit 200 enables for this polishing cell 10 several processing protocols as stated above, some of them being even equivalent in its final result.

For example for a specific job, the curvature and surface properties might be achieved for a specific lens by a two-step protocol (preparatory polishing followed by fine polishing), but also by a one-step protocol (only fine polishing, but a longer time).

Both processing protocols are equivalent with regard to the achieved result, but the duration of the two-step protocol is for example less than the duration of the equivalent one-step protocol. The movements in the two equivalent protocols may also be different.

In manufacturing this is an important advantage because in case that the first polishing disc 106 for preparatory polishing is worn out, the station might continue by switching from the two step protocol to its equivalent one-step protocol with a lower throughput.

Thus one understands that tools, in particular a first and a second tool, might enable different processing protocols leading to the same end result and that therefore the use of the tools and the station itself can be optimized in function of upcoming jobs.

The controller unit 200 is further configured to generate an output of enabled polishing protocols for processing of optical elements, which output is sent to the management system 310.

The management system 310 is further configured to control the transfer system 304 to convey optical elements as for example lens blanks to be processed according to specific job data only to a polishing station 302 where the enabled polishing protocol(s) corresponds to the job data of the optical elements to be processed.

This allows also to prevent malfunctioning of the polishing station 302 for example in case an operator installs accidently in one polishing cell 10 two second polishing discs 106' for fine polishing instead of two different polishing discs 106, 106', one for preparatory polishing and one for fine polishing. In this case, the polishing cell 10 can still function but only for jobs requesting the polishing protocol for one-step polishing (only fine polishing).

In addition, this allows also extending the functional range and features of the polishing station 302.

Indeed, a customer can buy a polishing station 302 with such a database 202 of polishing protocols in a first time only for use of one-step polishing protocols. In buying later on for example specific polishing discs 106, 106', he may access to other polishing protocols allowing for example two-step polishing or other specific polishing steps. In enabling for example equivalent polishing one-step and two-step protocols, the throughput of the polishing station 302 may be enhanced.

Furthermore, one may adapt and optimize the utilization rate of the polishing station 302.

Indeed, the management system 310 of the manufacturing facility 300 is for example configured
   to analyze a predetermined number of job data of optical elements to be processed,

- to determine an optimized polishing tool configuration of the pool of polishing stations 302, and
- to generate an output for exchange of polishing discs 106,106' within the pool of polishing stations 302 if the optimized polishing tool configuration differs from the working polishing tool configuration.

This may be simply illustrated by a simple example.

Assuming all four polishing stations 302 of the pool are equipped with specific "two" one-step-polishing discs 106 and in analyzing the upcoming job data, it turns out that the installed specific one-step-polishing discs are not suited for at least some of the optical elements to be manufactured and listed in the upcoming job data because their manufacturing process needs polishing discs of different size (tool diameter) and/or different curvature (tool radius of curvature) and/or different polishing slurry carriers.

Then the management system 310 can determine for example the number of polishing stations 302 that will be let unchanged and the number of polishing stations 302 that need to be equipped with new or different polishing discs, for example of different size. Preferentially, for the change of the polishing discs 106, 106', the management system 310 will select the polishing station 302 (or polishing cell(s) 10, 10', 10") where the polishing discs 106, 106' are near to be worn.

The output is for example displayed on a display and control panel 312 of the management system 310 to inform an operator in service who can then take the necessary steps to exchange the polishing discs 106, 106' in the indicated polishing stations 302 by scanning the consumable item 208 to be exchanged or replaced first in front of the identification tag reader 204.

Therefore, the manufacturing facility 300 can continue manufacturing with an optimized throughput.

Moreover, the identification tag reader 204 may also be a tag writer allowing registering of new information on the identification tag 206, like for example remaining life-time and other relevant information.

This allows for example re-use of the polishing disc 106, 106' when the life-time has not completely expired.

An example of the polishing cells 10, 10' and 10" is now described more in detail. As already stated, one polishing cell 10 is here disclosed as an example of a processing unit for processing surfaces of optical elements. Such a processing unit may carry out other processing steps than polishing like for example edging.

Each polishing cell 10, 10', 10" comprises a workpiece spindle 14 which projects into a work space 13 and by way of which a spectacle lens L to be polished, which is usually held by means of a blocking material M on a block piece S for mounting in the workpiece spindle 14 (see FIG. 4), can be driven to rotate about a workpiece axis of rotation C. In addition, the polishing cell 10 comprises two tool spindles 16, 16', which are associated with the workpiece spindle 14 and project oppositely into the work space 13 and on each of which a respective polishing tool 18, 18' is mounted to be drivable for rotation about a tool axis of rotation A, A' and to be axially adjustable along the tool axis of rotation A, A' (adjusting axes Z, Z'). The tool spindles 16, 16' are movable relative to the workpiece spindle 14 in common along a linear axis X extending substantially perpendicularly to the workpiece axis of rotation C and are pivotable about different pivot setting axes B, B', which extend substantially perpendicularly to the workpiece axis of rotation C and substantially perpendicularly to the linear axis X. In that case, the tool spindles 16, 16' are arranged one behind the other as seen in the direction of the linear axis X.

According to FIG. 2 the individual polishing cells 10, 10', 10", which are operable independently of one another, are so arranged in compact manner adjacent to one another in modular form—and optionally to be separately exchangeable as a respective module.

Within the polishing station 302, the transportation trays 308 with the lens blanks to be processed may be received and the lens blanks may be transferred automatically, for example by not shown portal handling system to any of the polishing cells and back to the transportation tray 308 after processing. Reference is made to DE10 2014 015 053 (US2017/0246720) describing such a portal handling system.

In particular, after the processing by polishing, the spectacle lens L polished to finished state can be transported to an integrated not shown washing unit 20 (schematically represented on FIG. 2) for removal of polishing medium residues by washing.

Figure 3:
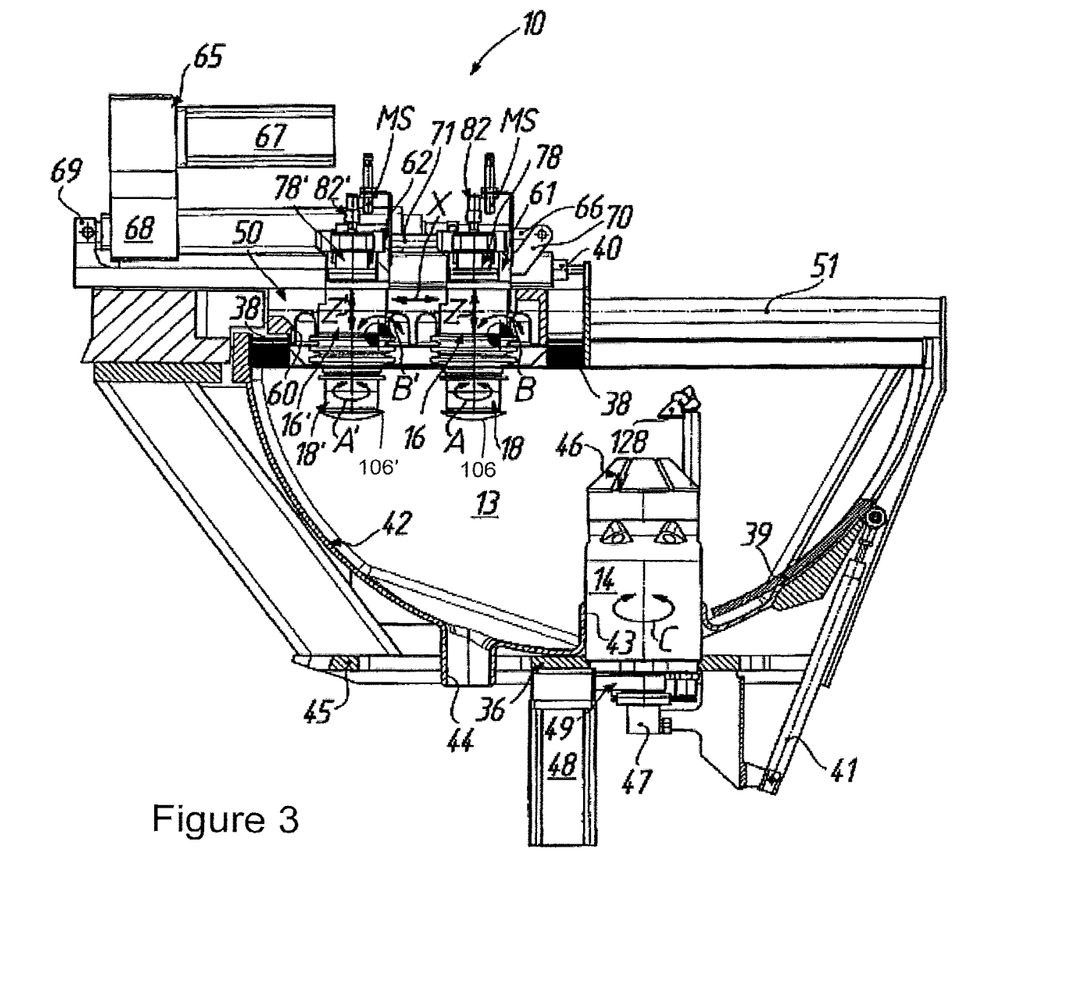
FIG. 3 shows a longitudinal sectional view of the polishing station which is identical to FIG. 6 of DE10 2014 015 053 (US2017/0246720)

For further description of the polishing cell 10, the work space 13 of the polishing cell 10 is surrounded by a frame 36 which can be constructed as, for example, a welded construction of steel parts. Upwardly, the work space 13 can be covered by a bellows-like work space cover 38 and is closable at the front by a sliding door 39. In order to open the work space 13 for access from outside, the work space cover 38, which is suitably guided laterally, can be displaced or retracted by means of a pneumatic cylinder 40.

In addition, a pneumatic cylinder 41 is provided for movement of the laterally guided sliding door 39 and is suitably pivotably connected between the sliding door 39 and the frame 36. Downwardly, the work space 13 is bounded by a trough 42, which is deep-drawn integrally from a plastics material and which is suitably fastened to the frame 36, with step-free wall surfaces and a receiving opening 43 for the workpiece spindle 14 (cf. FIG. 3), through which trough 42 the workpiece spindle 14 extends-suitably sealed at the circumference—from below so as to project into a lower region of the work space 13.

In FIG. 3, there can also be seen a drain opening 44 for the liquid polishing medium. With respect to FIG. 3, the polishing cell 10 may be installed in a tilted position such that drain opening 44 is disposed at the deepest point of the trough 42 in the state in which the polishing cell 10 is mounted.

The frame 36 has a base plate 45 at which the workpiece spindle 14 is flange-mounted below the receiving opening 43 in the trough 42 from above. At its end projecting into the work space 13 the workpiece spindle 14 has a collet chuck 46 which can be actuated by way of an actuating mechanism (not illustrated in more detail) so as to clamp a spectacle lens L, which is blocked on a block piece S, to the workpiece spindle 14 to be axially fixed and capable of rotational entrainment. A pneumatic cylinder, which is fastened below the base plate 45, for the said actuating mechanism is denoted by 47 (cf. FIG. 3), by means of which the collet chuck 46 can be opened and closed in a manner known per se.

A rotary drive 48—in the illustrated embodiment a speed-controlled asynchronous three-phase motor—is flange-mounted from below on the base plate 45. The rotary drive 48—similarly below the base plate 45—is drivingly connected by means of a cogged belt drive 49 with the roller-bearing-mounted spindle shaft of the workpiece spindle 14 so that the rotary drive 48 is capable of rotationally driving the workpiece spindle 14 at a predetermined rotational speed and with a predetermined direction of rotation (workpiece axis of rotation C).

A tool carriage 50 which is guided with respect to the frame 36 to be drivable along the linear axis X is provided above the workpiece spindle 14 for movement in common of the tool spindles 16, 16'. More precisely, provided for movement and positioning of the tool carriage 50, which is guided at two parallel guide rods 51 connected with the frame 36, is a rotary drive (not shown) which is mounted on the frame 36 in fixed location and which is drivingly connected with a ball screw drive (not shown).

The tool carriage 50 has a frame construction with an inner opening 60, which is substantially rectangular for receiving the two pivotable tool spindles 16, 16'. In that case one, i.e. front, tool spindle 16 is mounted on or in a front pivot yoke 61, which is pivotably connected with the tool carriage 50 on either side of the opening 60 to be capable of defined pivotation about one pivot setting axis B, and the other tool spindle 16' is mounted on a rear pivot yoke 62, which is pivotably connected with the tool carriage 50 behind the front pivot yoke 61 to be capable of defined pivotation about the other pivot setting axis B' again on either side of the opening 60.

A further linear drive 65 is provided for drive of the pivot yokes 61, 62, i.e. for defined pivotation in common of the two tool spindles 16, 16' about the pivot setting axes B, B' and is pivotably connected by one end thereof with the front pivot yoke 61 at a spacing from the corresponding pivot setting axis B and by the other end thereof with the tool carriage 50.

More specifically, in the illustrated embodiment the linear drive 65 is a proprietary so-called "electrocylinder" with an actuating rod 66 which can be moved in and out by way of a rotary drive 67 and a transmission 68 in the case of corresponding energization of the rotary drive 67. If the rotary drive 67 is not energized, self-locking is present in the transmission 68, i.e. the actuating rod 66 remains in its respective initial setting in the case of non-excessive external forces; an integrated measuring system can feed back the respective position. This linear drive 65 is pivotably mounted at its end at the drive side on a mounting fork 69 mounted on the tool carriage 50, whereas at the other end of the linear drive 65 the actuating rod 66 pivotably engages a forked pivot arm 70 secured to the front pivot yoke 61.

For transmission of the pivot movement from the front pivot yoke 61 to the rear pivot yoke 62 the two pivot yokes 61, 62 are in drive connection by way of a coupling rod 71 which is spaced from the pivot setting axes B, B', in particular above the latter by one end thereof at the front pivot yoke 61 and by the other end thereof at the rear pivot yoke 62.

In that respect it is apparent that in the case of the chain of pivotation formed as described above a defined axial movement out or movement in of the actuating rod 66 has the consequence that the pivot yokes 61, 62 are pivoted in defined manner about the pivot setting axes B, B', whereby the tool spindles 16, 16', which are arranged centrally in the respective pivot yoke 61 or 62, are pivoted while remaining in parallel orientation relative to one another.

Further details with respect to the tool spindles 16, 16' can be inferred from FIGS. 4, which by way of example show, for the two identically constructed tool spindles 16, 16' coupled to the respective pivot yoke 61, 61, the front tool spindle 16 (also) in section.

The tool spindle 16 comprises a spindle housing 74, by way of which the tool spindle 16 according to FIG. 4 is flange-mounted from below on the pivot yoke 61. The dot-dashed lines shown in FIG. 4 indicate a screw connection. The further components or subassemblies of the tool spindle 16 are rotatably mounted in the spindle housing 74 by way of a bearing arrangement of roller bearings comprising a lower fixed bearing 75 and an upper floating bearing 76, which are mounted in the spindle housing 74 at a spacing from one another by means of a spacer bush 77.

Each tool spindle 16, 16' has a piston-cylinder arrangement 78, 78' (also indicated in FIG. 3) for axial adjustment (adjusting axes Z, Z') of the respective polishing tool 18, 18' along the associated tool axis of rotation A, A'. The piston-cylinder arrangement 78 has a piston 80 which is received in a cylinder housing 79 and which is connected, to be effective in terms of actuation, in coaxial arrangement with a spindle shaft 81 movable out of the spindle housing 74 in accordance with FIG. 4. For movement of the spindle shaft 81 out of the spindle housing 74 the piston-cylinder arrangement 78 can be acted on pneumatically by way of a proprietary rotary transmission leadthrough 82, 82' at the end of the cylinder housing 79 at the top in the figures. In that case, the piston-cylinder arrangement 78 together with the spindle shaft 81 is rotatable in the spindle housing 74 about the tool axis of rotation A, as already indicated.

The cylinder housing 79 is, in addition, of two-part construction with a housing upper part 83 and a housing lower part 84, which are screw-connected together centered relative to one another at 85. In that regard, received in the interior for lining the cylinder housing 79 is a guide sleeve 86 of mineral glass which is secured in the housing upper part 83 with the assistance of an O-ring 87 and in which the piston 80, which consists of a graphite material at its guide surface, is received to be longitudinally displaceable. "Glass cylinders" of that kind, which are very easy-running and substantially free of stick-slip, are commercially available from, for example, the company Airpot Corporation, Norwalk, Conn., United States. In order to avoid jamming, which can result from axial alignment errors in the (ideally) coaxially arranged components, the piston 80 of the piston-cylinder arrangement 78 is tension-resistantly and compression-resistantly connected with the spindle shaft 81 by way of a thin rod 88 of spring steel and, in particular, by way of the screw connections shown in FIG. 4 at the top and bottom at the rod 88.

The housing lower part 84 of the cylinder housing 79 is rotatably supported by way of the floating bearing 76 in radial direction on the spindle housing 74 at the top in the figures. At the bottom in the figures, a labyrinth member 89 is flange-mounted on the housing lower part 84 by means of a screw connection 90 which in that case together with the housing lower part 84 axially clamps the inner ring of the fixed bearing 75 in place. The labyrinth member 89 forms, as the name itself indicates, together with the underside of the spindle housing 74 at 91 a sealing labyrinth with narrow gap dimensions and additionally has radially within the sealing labyrinth 91 an annular recess 92 for reception of a sealing ring 93, the sealing lip of which similarly sealably co-operates with the lower side of the spindle housing 74.

As FIG. 4 shows, the housing upper part 83 of the cylinder housing 79 passes through an opening 94 formed in the pivot yoke 61 and projects upwardly above this in FIG. 4. The housing upper part 83 of the cylinder housing 79 is there provided at the outer circumference with a toothing 95 for engagement by a cogged belt 96. The cogged belt 96 is drivable by way of a motor 97—which is flange-mounted from above on the pivot yoke 61 and is similarly of identical construction for each pivot yoke 61, 62—with a belt pulley 98 so as to rotate the piston-cylinder arrangement 78 and thus the spindle shaft 81 in the spindle housing 74 controllably in rotational speed and rotational direction about the tool axis of rotation A.

In addition, provided for torque transmission from the thus-rotating drivable cylinder housing 79 of the piston-cylinder arrangement 78 to the spindle shaft 81 is a splined shaft guide 99 with guide grooves 100, which are formed in the spindle shaft 81, and a flange nut 102, which is in engagement therewith by way of an axial bearing element 101—since it is known per se, it is indicated in FIG. 4 merely by a thick line—and which is received in the labyrinth member 89 and flange-mounted thereon by means of a screw connection 103, so that the flange nut 102 is connected with the cylinder housing 79 to be secure against relative rotation. Splined shaft guides of that kind are commercially available from, for example, the company Nippon Bearing Co Ltd, Ojiya-City, Japan.

To that extent it is evident that the spindle shafts 81 of the tool spindles 16, 16' are drivable—controllably in rotational speed and rotational direction—at a given time independently of one another for rotation about the tool axes of rotation A, A' and/or adjustable independently of one another along the tool axes of rotation A, A', in a given case also with very fine sensitivity (adjusting axes Z, Z').

Details with respect to the polishing tool 18, which is currently preferred for use in this polishing cell 10, can similarly be inferred from FIG. 4. According to that, the tool spindle 16, 16' have a tool mounting head 104 with a mounting plate 105 which is secured to the spindle shaft 81 of the tool spindle 16 to be capable of axial and rotational entrainment and at the same time to be detachable.

A polishing disc 106 which is considered here as a consumable item, is exchangeable mounted on the tool mounting head 104, for which purpose a base body 107 of the polishing disc 106 and the tool mounting head 104, more precisely the mounting plate 105 thereof, are provided with complementary structures 108 for axial detenting and rotational entrainment of the polishing disc 106 by the tool mounting head 104.

This interface, which is formed by the complementary structures 108, between polishing disc 106 and tool mounting head 104 is the subject of document EP 2 464 493 B1, to which, for avoidance of repetitions, express reference may be made at this point with regard to construction and function of the interface.

On the side of the mounting plate 105 remote from the polishing disc 106 the tool mounting head 104 has a ball joint 109 with a ball head 111 which is received in a ball socket 110 and which is constructed at a ball pin 112 securable to the spindle shaft 81 of the tool spindle 16, more precisely able to be screwed in at the end thereof. On the other hand, the ball socket 110 is formed in the mounting plate 105 with which the polishing disc 106 is detentable. In the illustrated embodiment the ball head 111 has a receiving bore 113 for a transverse pin 114, which extends through the ball head 111 by radiused ends and engages on either side of the bore head 111 in associated recesses 115 in the ball socket 110 so as to connect the mounting plate 105 in the manner of a universal joint with the ball head 111 and thus with the spindle shaft 81 of the tool spindle 16 to be capable of rotational entrainment.

In addition, a circularly annular support flange 116 is introduced between the ball pin 112 and the free end of the spindle shaft 81 and is secured to the spindle shaft 81 by means of the ball pin 112. A resilient annular element 117 consisting of, for example, a suitable foam material rests on the support flange 116, by way of which annular element the mounting plate 105 of the tool mounting head 104 can be resiliently supported on the support flange 116 at the ball pin side in such a manner that the polishing disc 106 detented with the mounting plate 104 seeks to self-align by its center axis with the ball pin 112 and thus the spindle shaft 81 of the tool spindle 16.

In addition, it can be seen in FIG. 4 that the tool mounting head 104 in an axially retracted setting of the spindle shaft 81 can be detented with the labyrinth member 89—as a part connected with the cylinder housing 79 to be secure against relative rotation—by means of a detent device 118. The detent device 118 has a plurality of spring projections 119, which are distributed around the circumference of the tool mounting head 104 and protrude along the tool axis of rotation A and which are in mechanically positive engagement with lugs 120 in an annular groove 121 formed at the labyrinth member 89. The polishing tool 18 can thus be mounted without force by detenting in a retracted setting at the tool spindle 16. For recognition of the moved-up position of the polishing tool 18—and thus a tool loading position of the tool spindle 16—an annular magnet RM is glued in place in the piston 80 of the piston-cylinder arrangement 78 and co-operates with a magnet sensor MS (see FIG. 3) in the vicinity of the rotary transmission lead-through 82.

Figure 5:
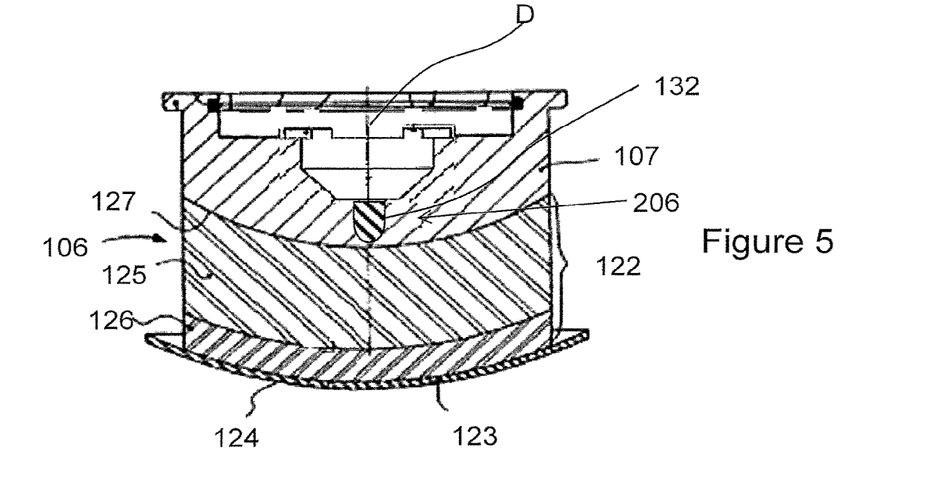
FIG. 5 shows a cross sectional view of an example of a polishing disc according to the present invention.

As also shown in FIG. 5, an intermediate layer 122, which is softer by comparison with the base body 107 and on which a polishing medium carrier 123 rests, of a resilient material is secured to the base body 107 of the polishing disc 106 illustrated here, the polishing medium carrier 123 forming the actual outer processing surface 124 of the polishing disc 106. This design of the polishing disc 106 is to that extent special, since the intermediate layer 122 has at least two regions of different hardness which are arranged one behind the other in the direction of the center axis of the polishing disc 106, wherein the region of the intermediate layer 122 adjoining the base body 107 is softer than the region of the intermediate layer 122 on which the polishing medium carrier 123 rests. More precisely, the two regions of the intermediate layer 122 are here formed by mutually different foam material layers 125, 126 of respectively constant thickness as seen along the center axis of the polishing disc 106, namely a softer foam material layer 125 on the base body 107, more precisely the spherical end surface 127 thereof, and a harder foam material layer 126 under the polishing medium carrier 123. The entire tool concept as such is also described in in DE 10 2014 015 052.6 (US 2017/0246729 A1) incorporated by reference.

In that case, the individual components (107, 125, 126, 123) of the polishing disc 106 are glued together. This polishing disc 106 is universally usable for a wide range of workpiece curvatures, in particular the actual construction and dimensioning thereof.

Other polishing tools or polishing discs can obviously also be used with the polishing cell 10 in correspondence with the respective polishing requirements.

The different polishing processes able to be performed according to a polishing protocol by the afore-described kinematics of the polishing cell 10—in which moreover a liquid polishing medium is supplied to the point of action between tool and workpiece by way of polishing medium nozzles 128 provided at the workpiece spindle 14 (see FIG. 3) are well-known to the expert and therefore shall not be described in more detail at this point.

Turning now more specifically to FIG. 5 showing more in detail a cross sectional view of a polishing disc 106.

As already stated, a polishing disc 106 can be considered as a consumable item for a polishing station 302. Indeed, polishing discs have a limited life-time and need to be changed regularly when worn out.

Furthermore, there exist different types of polishing discs 106 that can be used in a polishing station 302 as described above, for example one for preparatory polishing and one for fine polishing with different polishing coatings. In this case, a two-step polishing is achieved in realizing first a preparatory polishing with a first polishing disc 106 having preparatory polishing properties and supported by polishing tool 18 and a second polishing disc 106' having fine polishing properties and supported by polishing tool 18' (see FIG. 3).

The polishing disc 106 in the present invention differs from the polishing disc disclosed in EP 2 464 493 B1 by the fact that it comprises in addition an identification tag 206.

The identification tag 206 may be a matrix code or bar code, but in the present case is a RFID tag 132.

This RFID tag 132 comprises in a known way means for communication with a REID tag reader/writer 204 of the polishing station 302 (see FIG. 2).

In order to ward off any balancing problem of the polishing disc 106 during rotation, in particular vibrations, the RFID tag 132 is integrated in the base body 107 of the polishing disc 106 on the center axis D around which it rotates in functioning.

Figure 6:
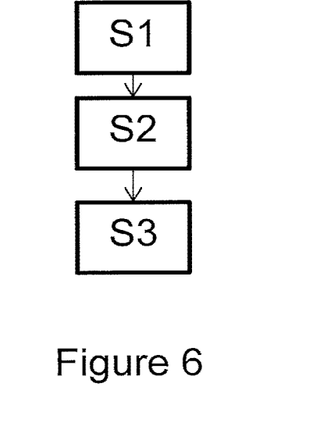
FIG. 6 shows an example of a flow chart of a method for operating a polishing station for processing of surfaces of optical elements like spectacle lenses as workpieces.

As shown on FIG. 6, the present invention also relates to a method for operating a surfacing station, in particular a polishing station 302, comprising the following steps:
- determining, for example by reading, S1 the information contained on the identification tag 206 of the consumable item 208,
- enabling S2 processing, in particular polishing protocol(s) for processing of optical elements as workpieces in function of the identified consumable item 208.

In a further development allowing re-use of consumable items 208, for example where the life-time has not yet completely expired, life-time data may be written in a step S3 to the identification tag 206 allowing re-use of the consumable item 208.

Figure 7:
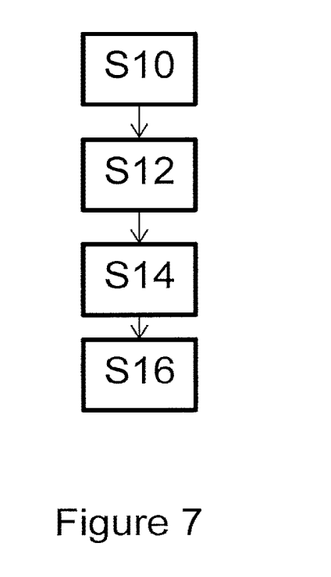
FIG. 7 shows an example of a flow chart of a method for operating a manufacturing facility for processing of optically effective surfaces of spectacle lenses as workpieces.

With regard to FIG. 7, the present invention further relates to a method for operating a manufacturing facility 300 comprising in particular the step S10 of conveying optical elements to be processed according to specific job data to a surfacing station, in particular a polishing station 302 where the enabled processing protocol(s), in particular polishing protocol(s) corresponds to the job data of the optical elements to be processed.

In a further development concerning polishing stations as surfacing stations, the method may comprise the steps of
- analyzing S12 a predetermined number of job data of optical elements to be processed,
- determining S14 an optimized polishing tool configuration of the pool of polishing stations, and
- generating S16 an output for exchange of polishing tools 106 within the pool of polishing stations if the optimized polishing tool configuration differs from the working polishing tool configuration.

One therefore understands that the polishing stations 302 according to the invention allow a safer use by avoiding malfunction in case an inattentive or distractive operator does not install the correct consumable item 208. Furthermore, the capacities and functions of the surfacing station, in particular polishing station 302 may evolve in function of the installed consumable items 208, for example polishing discs 106, 106'. Reuse of not completely worn out consumable item is now possible in a safe manner. The throughput of a manufacturing facility 300 may be optimized and manufacturing costs and delivery times are reduced.

REFERENCE NUMERAL LIST 10, 10', 10" processing unit (=polishing cell as example)
13 work space
14 workpiece spindle
16, 16' tool spindles
18, 18' polishing tool
20 washing station
36 frame
38 work space cover
39, 39', 39" sliding door
40 pneumatic cylinder
41 pneumatic cylinder
42 trough
43 receiving opening
44 drain opening
45 base plate
46 collet chuck
47 pneumatic cylinder
48 rotary drive
49 cogged belt drive
50 tool carriage
51 guide rod
60 opening
61 front pivot yoke
62 rear pivot yoke
65 linear drive
66 actuating rod
67 rotary drive
68 transmission
69 mounting fork
70 pivot arm
71 coupling rod
74 spindle housing
75 fixed bearing
76 floating bearing
77 spacer bush
78, 78' piston-cylinder arrangement
79 cylinder housing
80 piston
81 spindle shaft
82, 82' rotary transmission lead through
83 housing upper part
84 housing lower part
85 screw connection
86 guide sleeve
87 O-ring
88 rod
89 labyrinth member
90 screw connection
91 sealing labyrinth
92 annular recess
93 sealing ring
94 opening
95 toothing
96 cogged belt
97 motor
98 belt pulley
99 splined shaft guide
100 guide groove
101 axial bearing element
102 flange nut
103 screw connection
104 tool mounting head 105 mounting plate
106, 106' polishing disc
107 base body
108 complementary structures
109 ball joint
110 ball socket
111 ball head
112 ball pin
113 receiving bore
114 transverse pin
115 recess
116 support flange
117 resilient annular element
118 detent device
119 spring projection
120 lug
121 annular groove
122 intermediate layer
123 polishing medium carrier
124 processing surface
125 softer foam material layer
126 harder foam material layer
127 end surface
128 polishing medium nozzle
132 RFID tag
200 controller unit
202 database of polishing protocols
204 identification tag base (for example tag reader and/or tag writer)
206 identification tag
208 consumable item
209 control and display panel
300 manufacturing facility
302 surfacing station (=polishing station as example)
304 transfer system
306, 306-L conveyors
308 transportation trays
310 management system
312 display and control panel
A rotational axis of front polishing tool (open loop controlled in rotational speed)
A' rotational axis of rear polishing tool (open loop controlled in rotational speed)
B pivot setting axis of front polishing tool
B' pivot setting axis of rear polishing tool
C workpiece rotational axis (open loop controlled in rotational speed)
D center axis of polishing disc
cc second optically effective surface (concave)
cx first optically effective surface (convex)
L optical element (for example a spectacle lens)
M blocking material
MS magnet sensor
RM annular magnet
S block piece
X linear axis of tool carriage (closed loop controlled in position)
Z adjusting axis of front polishing tool (uncontrolled)
Z' adjusting axis of rear polishing tool (uncontrolled)
S1, S2, S3 steps of a method for operating a polishing station
S10, S12, S14, S16 steps of a method for operating a manufacturing facility for manufacturing optical elements

The invention claimed is:

1. A polishing disc for a polishing tool for processing of surfaces of optical elements as workpieces for a polishing station, the polishing disc comprising:
 a base body which has a center axis and to which is secured an intermediate layer, on which a polishing medium carrier rests, of a resilient material, and
 an RFID tag configured to be read by the identification tag base of the polishing station, and the RFID tag including a type of the polishing disc and life-time data,
 wherein the RFID tag is integrated in the base body of the polishing disc on the center axis of the base body in order to ward off any balancing problems of the polishing disc during rotation.

2. The polishing disc for a polishing tool according to claim 1, wherein the life-time data includes remaining life-time of the polishing disc written on the RFID tag allowing re-use of the polishing disc until the life-time of the polishing disc has not expired.

3. The polishing disc for a polishing tool according to claim 1, wherein
 the RFID tag further comprises a manufacturer of the polishing disc and a production date of the polishing disc.

4. The polishing disc for a polishing tool according to claim 1, wherein
 the RFID tag further comprises information related to specific features or functions of a polishing station that may be enabled or not.

5. The polishing disc for a polishing tool according to claim 2, wherein
 the RFID tag further comprises information about a manufacturer of the polishing disc and a production date of the polishing disc.

6. The polishing disc for a polishing tool according to claim 2, wherein
 the RFID tag further comprises at least one of a size of the polishing disc and a curvature of the polishing disc.

7. The polishing disc for a polishing tool according to claim 1, wherein the intermediate layer is formed by two different foam material layers forming two regions of different hardnesses.

8. The polishing disc for a polishing tool according to the claim 7, wherein the harder foam material layer is mounted under the polishing medium carrier.

9. The polishing disc for a polishing tool according to claim 1, wherein the polishing medium carrier is configured for preparatory polishing or grinding.

10. The polishing disc for a polishing tool according to claim 1, wherein the polishing medium carrier is configured for fine polishing.

11. The polishing disc for a polishing tool according to claim 1, wherein the base body includes a cavity configured to received a tool mounting head of the polishing tool, and a spherical end surface on which the intermediate layer is secured, and the RFID tag is disposed in the base body between the cavity and the end surface in a direction along the center axis of the base body.

* * * * *